(No Model.) 2 Sheets—Sheet 1.

F. A. HALSEY.
STEAM ROCK DRILL.

No. 295,000. Patented Mar. 11, 1884.

Witnesses:
Henry Eichlinger
a. S. Fitch

Inventor
Frederic A Halsey
W. Fitch.
atty.

(No Model.)

F. A. HALSEY.
STEAM ROCK DRILL.

No. 295,000.

2 Sheets—Sheet 2.

Patented Mar. 11, 1884.

Witnesses:
Henry Eidling
A. S. Fitch

Inventor
Frederic A Halsey
P. V. Fitch,
Atty.

N. PETERS. Photo-Lithographer, Washington, D.C.

UNITED STATES PATENT OFFICE.

FREDERIC A. HALSEY, OF NEW YORK, N. Y., ASSIGNOR TO THE RAND DRILL COMPANY, OF SAME PLACE.

STEAM ROCK-DRILL.

SPECIFICATION forming part of Letters Patent No. 295,000, dated March 11, 1884.

Application filed January 16, 1884. (No model.)

*To all whom it may concern:*

Be it known that I, FREDERIC A. HALSEY, of the city of New York, in the county and State of New York, and a citizen of the United States of America, have invented certain Improvements in Steam Rock-Drills and Analogous Machines, of which the following is a full, clear, and exact description, reference being had to the accompanying drawings, forming part of this specification.

My invention relates to steam rock-drills and other analogous machines actuated by steam, compressed air, or other elastic fluid, all of which will be included in this specification under the name of "steam."

This invention consists in the devices and combination of devices hereinafter described, whereby the piston, on its return, after making its working-stroke, compresses in the upper end of the cylinder the residual steam remaining therein after exhaustion, such compressed steam acting as a cushion to arrest the piston at the end of its upward stroke, and having stored in it energy expended in making said stroke, which assists in propelling the piston in its downward or working stroke.

I will proceed to describe in full an operative steam-drill embodying my present invention, which drill also contains, as I believe, other novel and patentable devices, which, however, I reserve herefrom and have made the subject of separate applications for Letters Patent, which I have filed simultaneously herewith, intending to limit my claim in this specification to those parts of the described machine which relate to the said compression and use of the residual steam in the upper end of the cylinder.

The accompanying drawings represent a steam rock-drill embodying my improvement.

Figure 1:
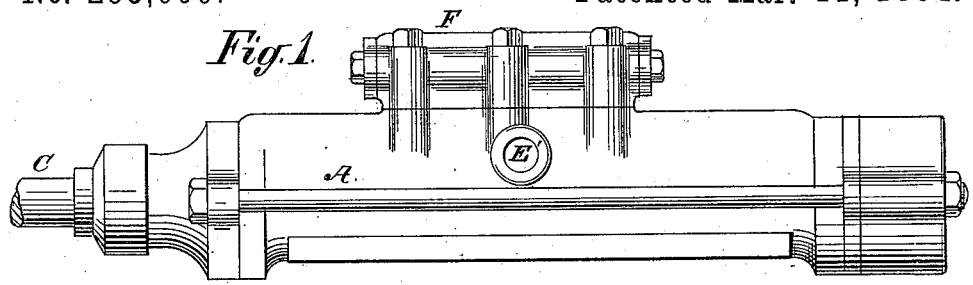
Figure 2:
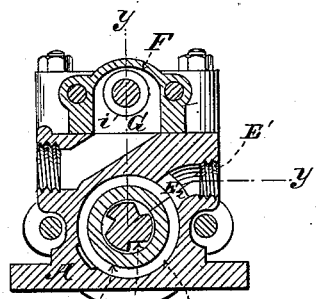
Figure 3:
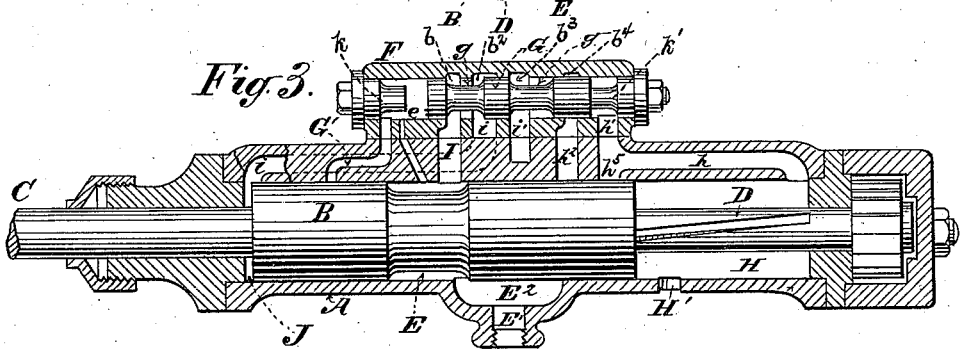

Figure 1 is a side elevation. Fig. 2 is a transverse section on the line $xx$, Fig. 4. Figs. 3, 4, 5, and 6 are longitudinal sections, taken through the line $yy$, Fig. 2, respectively, showing the piston in elevation in various positions.

For clearness of illustration the lower portions of Figs. 3, 4, 5, and 6 represent as in a vertical plane that portion of the line $yy$ which extends obliquely upward from the center of the cylinder, and then horizontally outward through the nozzle which is for connection with the steam-pipe.

A is the cylinder, and B is the piston, which is elongated sufficiently to afford space for a steam-chamber in its middle portion, and also to perform the function of opening and closing the steam-ports hereinafter described.

C is the piston-rod which carries the drill-tool, and D the spiral rod for effecting the rotation of the drill. The middle portion of the piston is circumferentially grooved, and the annular space E, between the grooved portions of the piston and the wall of the cylinder, serves as a steam-chest to receive steam through the nozzle E', which projects from the side of the cylinder, as shown in the drawings.

F is a valve-chest connected with the side of the cylinder, as shown, and G is a single cylindrical valve fitted to work in a correspondingly-shaped chamber in said chest, which said valve is operated by steam introduced into said chamber by ports leading from the steam-chest E.

Figure 5:
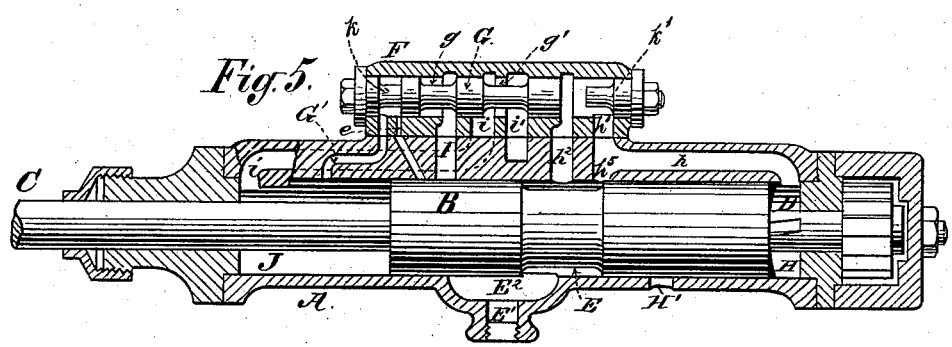

$h$ is the inlet-port communicating between the upper end, H, of the cylinder and the upper end of the valve-chest, and also opening into the cylinder at a point where it will communicate with the steam-chest E when the piston is at the end of its upward stroke, as seen in Fig. 5.

Figure 4:
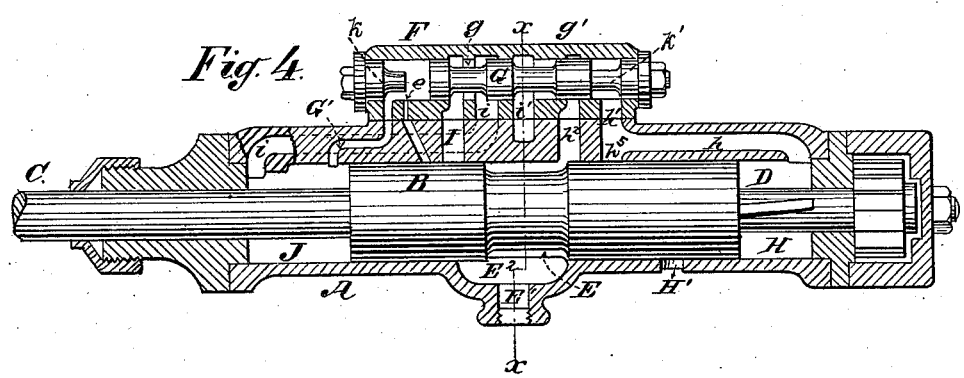

$h^2$ is also a port communicating likewise between the interior of the cylinder A and the valve-chest F, near its upper end, opening into the cylinder at a point where it will be uncovered and communicate with the steam-chest E when the piston has reached, in its upward stroke, the position shown in Fig. 4, and will be closed and the steam cut off from the upper end of the cylinder by the piston in its downward movement.

$i'$ is the exhaust-port leading from the valve-chest.

$i$ is a steam-passage communicating between the lower end, J, of the cylinder and the valve-chest, as shown in the drawings, which serves both as an inlet and outlet port.

Figure 6:
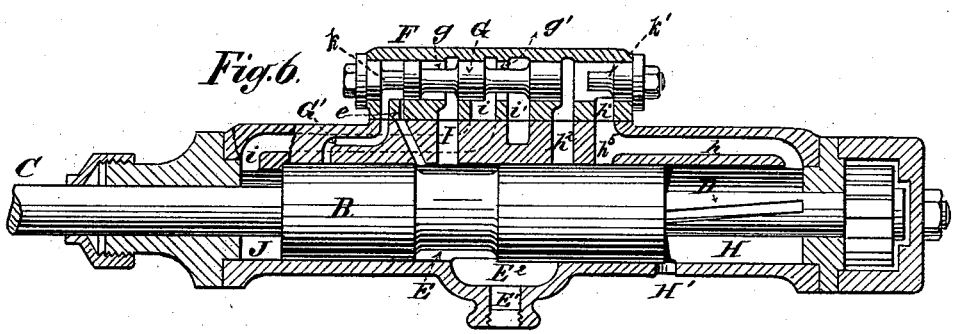

I is a port communicating between the cylinder and the valve-chest, and so located that it will be uncovered by the piston and communicate with the steam-chest E when the piston is in the position shown in Fig. 6.

$e$ is a port communicating between the lower end of the valve-chest and the cylinder, and located, as shown in the drawings, so as to be controlled by the portion of the piston below the circumferential groove; and G' is an exhaust-port communicating between the lower end of the valve-chest and the cylinder A, the same being also controlled by the said lower portion of the piston. The valve-chest is internally circumferentially grooved, forming internal annular steam-spaces, into which the outer mouths of the ports $h^2$, $i$, and I, respectively, open, the portions of the interior wall or face of said chest not included in said annular grooves constituting the valve-seats of the cylindrical portions of the valve G. The said valve G is formed, as hereinbefore stated, of a single cylinder of metal circumferentially grooved, as shown in the drawings, the cylindrical parts fitting with steam-tight joints into the said valve-seats. The heads $k$ and $k'$ of the valve-chest, at either end, against which the ends of the valve abut, project into the chest with reduced diameters, thus respectively providing steam-spaces in the valve-chest at the ends of the valve, when the valve is in contact with said heads, which communicate, respectively, with ports.

$E^2$ is a longitudinal groove or recess in the cylinder communicating with the steam-chest formed in the cylinder, and into which opens the steam-supply pipe E', that communicates with the boiler. This groove $E^2$ permits the circumferential groove in the piston, and of course the piston itself, as well as the cylinder, to be made considerably shorter than it would otherwise have to be, in order to maintain constant communication between the pipe E' and the said steam-chest, and yet permit the piston to have the requisite length of stroke.

H' is the exhaust-port of the upper end of the cylinder opening through the wall thereof, and which is controlled by the upper cylindrical portion of the piston, and said port is located, as shown in the drawings, where it will be uncovered by the piston only momentarily when the piston is at or near the limit of its downward stroke, being covered and closed by the piston at all other times. When it has reached the position shown in Fig. 5, the piston will uncover the inner mouth, $h^3$, of the port $h$ and thereby admit steam into the upper end of the valve-chest, whereby the valve will be thrown downward into the position shown in Figs. 5 and 6, thus closing the communication through the annular space between the ports $i$ and I and opening communication through the annular space between $i$ and $i'$, thus closing the outlet-port to the lower end of the cylinder, even when the port I is opened by the piston, and opening the channel for exhausting from the lower end of the cylinder; also, by the uncovering of port $h^5$ steam is admitted into the upper end, H, of the cylinder. On the lower end of the cylinder the steam exhausts through the passage $i$ into the port $i'$ through the annular space $g'$, which is opened by the downward shift of the valve in the positions shown in Figs. 5 and 6. The piston will now begin its downward movement, and close successively the inner mouths of the ports $h$ and $h^2$, thereby cutting off the steam from the upper end of the cylinder, when of course from this point the steam will act expansively to accomplish the remainder of the downward stroke. Then as the piston continues its downward movement it will uncover the port I; but as the communication between I and $i$ is at the moment closed, steam is not then admitted to the lower end of the cylinder through said port $i$. The piston next uncovers the port $e$, after closing the exhaust-port G', steam being thus admitted to the lower end of the valve-chest from the steam-chest through said port $e$, and operating to throw the valve upward, the steam at the upper end of the valve-chest being at the moment exhausting through ports $h'$ and $h$, the upper end of the cylinder and exhaust-port H', whereby by this movement of the valve communication is opened between I and $i$, and steam is again admitted into the lower end of the cylinder. Now, it is obvious that upon the closing of the exhaust-port H' by the piston in its upward stroke the residual steam then remaining in the upper end of the cylinder will be confined therein, and during the remainder of the said upward stroke, and will therefore be gradually compressed, and its elastic resistance will contribute to arrest the movement of the piston, thus constituting a cushion for the piston, and that thereby there will also be stored up in said compressed steam a part of the energy expended in propelling the piston in said upward stroke, and that the energy thus stored will be re-expended in assisting in propelling the piston in the downward or working stroke. By this operation the said residual steam is, without the loss of energy expended in its compression, utilized to furnish a cushion for assisting to arrest the rapid movement required of the piston in its upward stroke, thus obviating the necessity for the employment of live steam for this purpose, and thereby economizing in the use of steam.

The various parts of the machine described are susceptible of modification without departing from the essential feature of my invention, which consists in the devices by which the residual steam remaining in the upper end of the cylinder after the exhaust-port is closed is compressed in said upper end of the cylinder during the remainder of the upward stroke of the piston, and being thus compressed is utilized to assist in arresting the upward stroke of said piston, and in propelling the piston in its return or downward stroke.

It is evident that the devices for accomplishing the essential feature of my invention, as described, may be employed in a drill in which the means for distributing the steam to the ends of the cylinder and actuating the piston are other than those herein specifically described.

In three separate applications, numbered, respectively, 110,082, (filed October 26, 1883,) 117,722, and 117,724, the latter two being filed simultaneously herewith, I have claimed several of the herein-described devices—namely, in No. 110,082 I have claimed the means for controlling the transmission of steam for preventing its premature admission to the lower end of the cylinder, and the consequent cushioning of the piston thereon. In No. 117,722 I have claimed the means for cutting off the steam, whereby it is used expansively; and in No. 117,724 I have claimed the combination of the means for preventing the premature introduction of steam to the lower end of the cylinder, with means for using steam expansively.

What I claim as my invention, and desire to secure by Letters Patent, is—

In a steam rock-drill or other analogous machine, the cylinder and piston, the passages for distributing steam to the cylinder, and the valve governing said passages, together with the exhaust-port leading from the upper end of the cylinder and governed by the piston, and located relatively thereto, as described, so that the residual steam remaining in the upper end of the cylinder after the exhaust is confined therein and retained while the piston makes its upward stroke, and until on its return-stroke the exhaust is again opened, whereby the steam in its compression assists in arresting and terminating the upward stroke, and by its re-expansion assists in propelling the piston in its downward stroke, as described.

FREDERIC A. HALSEY.

Witnesses:
   A. G. N. VERMILYA,
   A. S. FITCH.